United States Patent

[11] 3,603,213

[72] Inventor James N. Tootle
 Kalamazoo, Mich.
[21] Appl. No. 806,531
[22] Filed Mar. 12, 1969
[45] Patented Sept. 7, 1971
[73] Assignee Pneumo Dynamics Corporation
 Cleveland, Ohio

[54] BUSHING-RESTRICTOR
 11 Claims, 5 Drawing Figs.
[52] U.S. Cl. .................................. 92/153,
 92/165, 308/240
[51] Int. Cl. ................................. F16c 37/00,
 F16c 29/00
[50] Field of Search .......................... 92/86, 163,
 153, 155, 88, 165, 168-171; 308/240, 76, 17;
 123/41.8, 41.82, 41.79; 138/42; 123/193 C

[56] References Cited
 UNITED STATES PATENTS

| 5,024 | 3/1847 | Eddy | 123/193 C |
|---|---|---|---|
| 221,223 | 10/1879 | Epping | 123/193 C |
| 1,386,219 | 8/1921 | Archer | 308/77 |
| 1,438,915 | 12/1922 | Howe | 123/41.8 |
| 2,315,674 | 4/1943 | Tichvinsky et al. | 308/76 |
| 2,982,590 | 5/1961 | Gunning | 92/168 X |
| 3,038,448 | 6/1962 | Corwin | 92/168 X |
| 3,143,933 | 8/1964 | Norton | 92/168 X |
| 3,474,709 | 10/1969 | Hamlin | 92/171 X |
| 1,108,761 | 8/1914 | Kieser | 308/76 |
| 1,108,064 | 8/1914 | Bonom | 308/76 |
| 1,218,808 | 3/1917 | Sheehy | 308/240 |
| 1,485,985 | 3/1924 | Jones | 308/240 |
| 2,661,721 | 12/1953 | Sherwen | 92/168 X |
| 2,799,523 | 7/1957 | Parker | 92/168 X |
| 2,806,450 | 9/1957 | Geyer | 92/33 |
| 2,901,297 | 8/1959 | Sternlicht | 308/240 X |
| 3,208,803 | 9/1965 | Hennells | 308/36.2 X |

Primary Examiner—Martin P. Schwadron
Assistant Examiner—Allen Ostrager
Attorney—Stephen M. Mihaly ABSTRACT: A bushing-restrictor having a plurality of axially spaced circumferential grooves in its outer periphery, connected together by axial slots extending through alternate lands between the grooves on opposite sides of the bushing-restrictor diametrically across from each other.

PATENTED SEP 7 1971

3,603,213

INVENTOR
JAMES N. TOOTLE

BY Stephen M. Mihaly
ATTORNEY 3,603,213

1

BUSHING-RESTRICTOR

BACKGROUND OF THE INVENTION

The present invention relates generally as indicated to a bushing-restrictor and more particularly to a bushing-restrictor having novel means for providing restricted flow past the rod end of an actuator to cool the same.

High-temperature nozzle actuators for afterburners and the like usually require supplemental cooling at the rod end of the actuator for dependable, trouble-free service. It has been common practice to effect such cooling by providing a stack of orifice plates in the rod end of the actuator that permit an allowable cooling flow therethrough, but such orifice plates have not proven to be entirely satisfactory especially where weight and space requirements are a factor, as in aircraft and space applications, since the orifice stack and pressure vessel therefor are relatively large and heavy.

SUMMARY OF THE INVENTION

With the foregoing in mind, it is a principal object of this invention to provide a relatively inexpensive combination bushing and restrictor of lightweight and compact construction which both supports the actuator rod and permits restricted flow through the rod end of the actuator cylinder for cooling the same in a novel manner.

Another object is to provide such a bushing-restrictor which precludes passage of any large contaminants therethrough.

Still another object is to provide such a bushing-restrictor which is free-floating thereby permitting hydraulic pressure at the rod side of the actuator cylinder to urge the bushing-restrictor into engagement with the adjacent packing to compress the same thus assisting in maintaining a fluidtight seal.

These and other objects of the present invention may be achieved by providing the bushing-restrictor with a plurality of axially spaced circumferential grooves in its outer periphery, connected together by axial slots extending through alternate lands between the grooves on opposite sides of the bushing-restrictor diametrically across from each other. A slight diametral clearance between the inner end of the bushing-restrictor and the adjacent wall of the actuator prevents entry of any large contaminants into the grooves which might otherwise clog the same.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

2

DESCRIPTION OF THE PREFERRED EMBODIMENT

Figure 1:
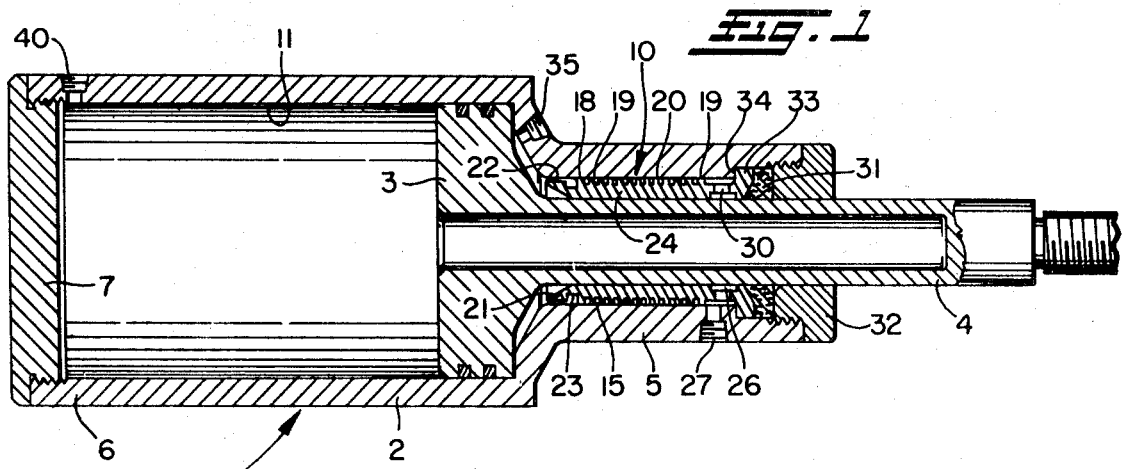
FIG. 1 is a longitudinal schematic section through a typical hydraulic actuator having a preferred from of bushing-restrictor disposed in the rod end of the actuator for supporting the actuator rod and permitting circulation of cooling fluid through such rod end.
Figure 2:
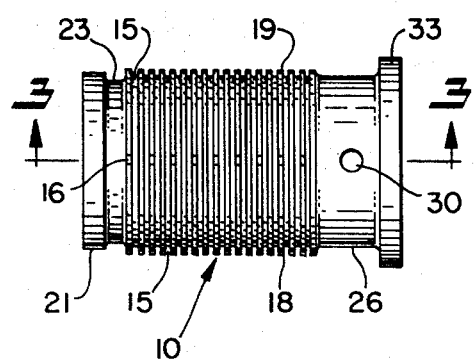
FIG. 2 is an enlarged side elevation view of the bushing-restrictor shown in FIG. 1.
Figure 4:
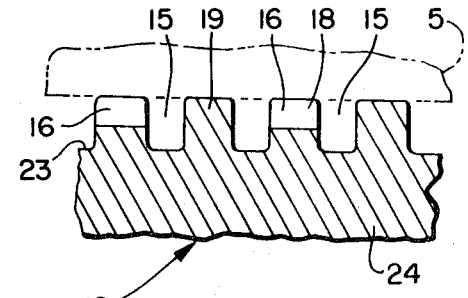
FIG. 4 is an enlarged fragmentary section of the encircled portion of FIG. 3.
Figure 3:
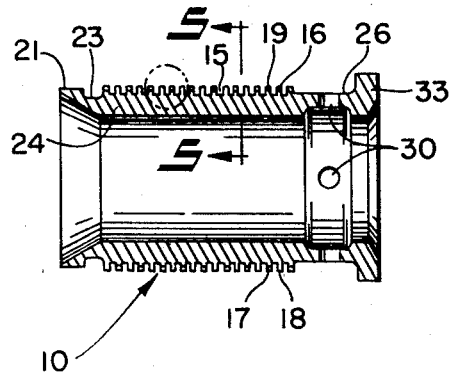
FIG. 3 is a longitudinal section through the axial slots in the bushing-restrictor of FIG. 2, taken on the plane of the line 3—3 thereof.
Figure 5:
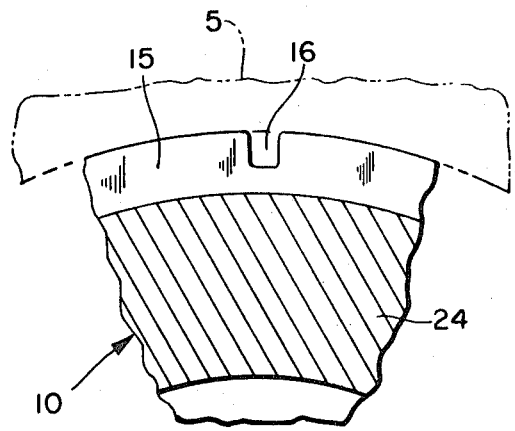
FIG. 5 is an enlarged fragmentary transverse section through one of the grooves in the bushing-restrictor of FIG. 3, taken on the plane of the line 5—5 thereof.

In FIG. 1 there is a schematic showing of a hydraulic actuator 1 of a type commonly used in afterburners and the like, comprising an actuator cylinder 2 having a piston 3 axially reciprocable therein for reciprocating a piston rod 4 which projects through an elongated end portion 5 of reduced diameter. The opposite or head end 6 of the cylinder 2 is closed by an end cap assembly 7.

Contained within the rod end portion 5 surrounding the piston rod 4 is a preferred form of bushing-restrictor 10 in accordance with this invention which not only performs the usual bushing functions of maintaining the piston rod 4 coaxial with the cylinder bore 11 and transferring the side loads incurred by the piston rod 4 to the cylinder 2, but also permits flow of a small portion of the hydraulic fluid supplied to the rod end of the cylinder through the rod end portion 5 to provide effective cooling thereof which is necessary for effective operation of the actuator when used in high-temperature applications in a manner to be subsequently fully explained.

The details of construction of the bushing-restrictor 10 which permits such restricted flow can readily be seen in FIGS. 1-5, wherein a plurality of axially spaced annular grooves 15 are shown provided in the outer periphery of the bushing-restrictor sleeve 24, connected together by axial slots 16 and 17 extending through alternate lands 18 and 19 between the grooves 15 circumferentially spaced apart from each other, preferably on opposite sides of the bushing-restrictor diametrically across from each other. The outer diameter of the lands 18 and 19 is substantially the same as the inner diameter of the bore 20 in the rod end portion 5 of the cylinder 2 so that fluid cannot pass over the lands, but the OD of the inner end 21 of the bushing-restrictor 10 is slightly less than the ID of the bore 20 to provide a slight diametral clearance 22 therewith to permit hydraulic fluid to enter the enlarged groove 23 adjacent thereto while restricting the passage of any large contaminants which may be contained in the fluid, thus acting as an edge filter. The fluid flowing past the edge filter 22 into the enlarged groove 23 flows through an axial slot 16 into the next groove 15 where it flows 180° around the bushing-restrictor to the opposite side and then passes through the next slot 17, and so on through the slots from groove to groove for increased circulation of the fluid through said grooves.

Adjacent the last land 19 there is provided another groove 26 of greater axial extent then the grooves 15 to establish communication with a discharge passage 27 in the rod end 5 for return of the cooling fluid to a reservoir (not shown). Although the number and size of annular grooves 15 and axial slots 16, 17 may be varied as desired depending upon the amount of cooling flow desired, a bushing-restrictor having 17 annular grooves 0.028 inch wide and 0.035 inch deep, and 18 slots approximately 0.014 inch wide and 0.020 inch deep provides an allowable cooling flow through a 1.036 inch diameter bushing-restrictor. The enlarged groove 23 may be 0.125 inch wide and 0.067 inch deep, whereas the elongated groove 26 may be 0.250 inch wide and 0.035 inch deep, and there may be a clearance 22 of approximately 0.004 inch between the inner end 21 of the bushing-restrictor and the bore 20. Exert for the radial holes 30 through the bushing-restrictor sleeve 24 in the region of the groove 26 which provide for lubrication of the piston rod 4, the sleeve 24 is desirably imperforate as shown.

As shown in FIG. 1, a suitable packing 31 is disposed in the rod end portion 5 outwardly of the bushing-restrictor 10 which may be compressed to the desired extent and held in place by a suitable retainer 32. An out-turned flange 33 on the outer end of the bushing-restrictor 10 is adapted to engage a stop shoulder 34 on the wall of the bore 20 to prevent the bushing-restrictor from being pushed into the cylinder 2 by the packing 31. However, the bushing-restrictor 10 is substantially free-floating, whereby the hydraulic fluid admitted to the rod end of the cylinder 2 through the port 35 will urge the bushing-restrictor toward the packing 31 to further compress the same and thus prevent loosening of the seal and leakage therepast even should the packing shrink with age. Fluid is permitted to flow into and out of the head end 6 of the cylinder 2 through a port 40 therein. If desired, a portion of that fluid may be used to cool the piston rod 4 internally by making the piston rod hollow as shown.

From the above discussion it can now be seen that the bushing-restrictor of the present invention permits a small allowable cooling flow to pass through the rod end of the actuator without requiring the usual multiple-stacked orifice system, at a substantially savings in space and weight. The bushing-restrictor is of a relatively simple one-piece construction which may be readily installed in the actuator, and because of its free-floating nature, it will be urged against the adjacent packing by the fluid in the cylinder to assist in compressing the packing and thus help prevent leakage therepast.

I, therefore, particularly point out and distinctly claim as my invention:

1. A fluid actuator comprising an actuator cylinder, a piston axially reciprocable in said cylinder, means for permitting fluid to flow into and out of opposite ends of said cylinder for reciprocating said piston, a rod projecting from said piston through a bore in one end of said cylinder, and a bushing-restrictor contained in said bore surrounding said rod, said bushing-restrictor comprising a sleeve having a plurality of axially spaced annular grooves in its outer periphery, the lands which define said grooves therebetween having a close sliding fit in said bore, and axial slots extending through said lands, said axial slots through adjacent ones of said lands being circumferentially offset from each other and of a size to permit a small portion of the fluid contained in the rod end of said cylinder to circulate through and around said grooves before discharging to the adjacent groove for cooling said rod end, the inner end of said sleeve having an outer diameter which is slightly less than the inner diameter of said bore to provide a slight diametral clearance which acts as an edge filter for permitting the fluid in the rod end of said cylinder to pass into the adjacent groove in said sleeve while restricting the passage of any large contaminants contained in the fluid, said sleeve having an additional groove adjacent said inner end which is slightly deeper than said plurality of axially spaced annular grooves for receiving the fluid passing through said diametrical clearance, said sleeve having still another groove adjacent the outer end of said sleeve which is axially longer than said plurality of axially spaced annular grooves, and radial holes extending through said sleeve communicating with said axially longer groove for lubricating said rod.

2. A fluid actuator comprising an actuator cylinder, a piston axially reciprocable in said cylinder, means for permitting fluid to flow into and out of opposite ends of said cylinder for reciprocating said piston, a rod projecting from said piston through a bore in one end of said cylinder, and a bushing-restrictor contained in said bore surrounding said rod, said bushing-restrictor comprising a sleeve having a plurality of axially spaced annular grooves in its outer periphery, the lands which define said grooves therebetween having a close sliding fit in said bore, axial slots extending through said lands of a size to permit a small portion of the fluid contained in the rod end of said cylinder to flow through and around said grooves for cooling said rod end, and radial holes extending through said sleeve communicating with one of said grooves for lubricating said rod.

3. A fluid actuator comprising an actuator cylinder, a piston axially reciprocable in said cylinder, means for permitting fluid to flow into and out of opposite ends of said cylinder for reciprocating said piston, a rod projecting from said piston through a bore in one end of said cylinder, and a bushing-restrictor contained in said bore surrounding said rod, said bushing-restrictor comprising a sleeve having a plurality of axially spaced annular grooves in its outer periphery, the lands which define said grooves therebetween having a close sliding fit in said bore, said sleeve having another groove adjacent the inner end thereof in direct fluid communication with the rod end of said cylinder, and axial slots extending through said lands between said axially spaced annular grooves, said axial slots through adjacent ones of said lands being circumferentially offset from each other and of a size to permit a small portion of the fluid entering said additional groove adjacent the inner end of said sleeve from the rod end of said cylinder to flow through and around said grooves before discharging to the adjacent groove for cooling said rod end.

4. The fluid actuator of claim 3 wherein said axial slots through alternate ones of said lands are located on opposite sides of said sleeve diametrically opposite each other to maximize the circulation of fluid through said annular grooves.

5. The fluid actuator of claim 3 wherein the inner end of said sleeve has an outer diameter which is slightly less than the inner diameter of said bore to provide a slight diametral clearance which acts as an edge filter for permitting the fluid in the rod end of said cylinder to pass into the groove adjacent the inner end of said sleeve while restricting the passage of any large contaminants contained in the fluid.

6. The fluid actuator of claim 5 wherein said groove adjacent the inner end of said sleeve is slightly deeper than said axially spaced annular grooves for receiving the fluid passing through said diametral clearance.

7. The fluid actuator of claim 3 further comprising a packing, and means for retaining said packing within said bore outwardly of said sleeve, the outer end of said sleeve having an out-turned flange thereon projecting radially outwardly beyond said lands, and said bore having a shoulder adapted to be engaged by said out-turned flange to prevent said bushing-restrictor from being forced into said cylinder by said packing.

8. The fluid actuator of claim 7 wherein said bushing-restrictor is substantially free-floating within said bore, whereby the fluid in said rod end of said cylinder acting on said bushing-restrictor urges said bushing-restrictor toward said packing to compress the same and thus prevent loosening of the packing and leakage therepast.

9. The fluid actuator of claim 3 wherein said sleeve is substantially imperforate.

10. The fluid actuator of claim 5 wherein said diametrical clearance is approximately 0.004 inch.

11. The fluid actuator of claim 2 wherein said one groove is adjacent the outer end of said sleeve.